Dec. 17, 1940.   G. E. CONDLIFFE   2,225,033
TELEVISION SYSTEM
Filed April 8, 1937
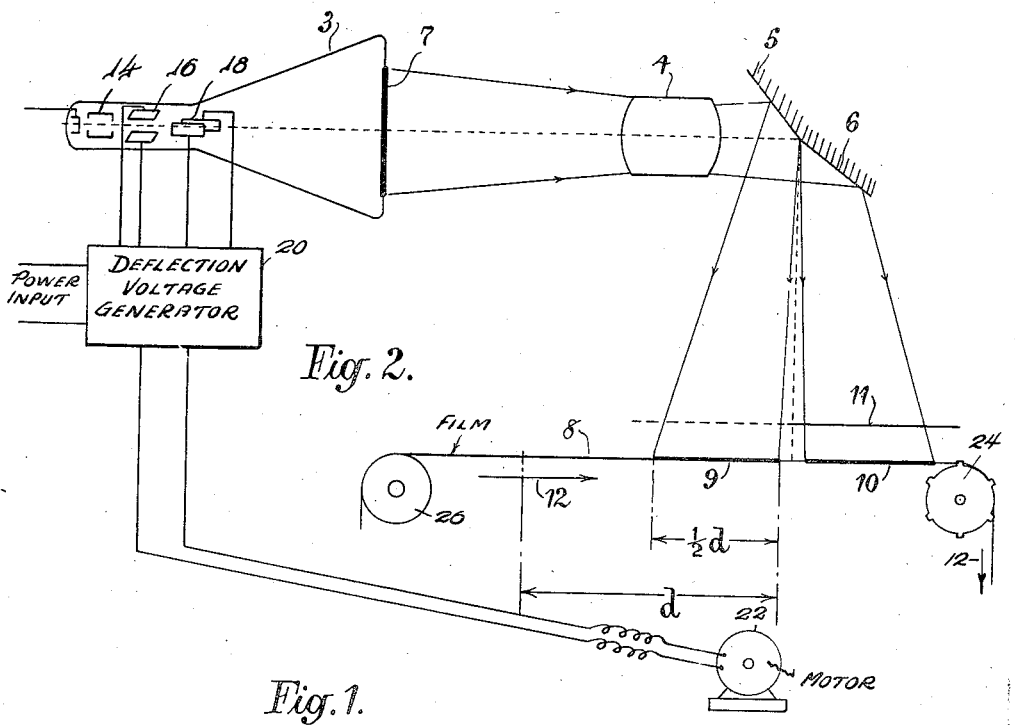
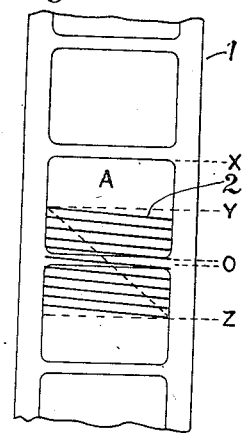
INVENTOR
GEORGE EDWARD CONDLIFFE
BY
ATTORNEY Patented Dec. 17, 1940

2,225,033

UNITED STATES PATENT OFFICE 2,225,033

TELEVISION SYSTEM

George Edward Condliffe, Gerrards Cross, England, assignor to Electric & Musical Industries Limited, Hayes, Middlesex, England, a company of Great Britain Application April 8, 1937, Serial No. 135,621
In Great Britain April 9, 1936

3 Claims. (Cl. 178—7.2)

This invention relates to television transmitting systems employing interlaced scanning and has particular reference to the transmission of continuously moving cinematograph films.

In a known method of interlacing in which a double printed film is employed, that is to say a film having each picture duplicated, the first frame is scanned along lines in the order one, three, five, seven and so on, the next frame being scanned along lines in the order two, four, six and so on, the odd and even sets of scanning lines being interlaced in the reconstituted picture.

When a standard cinema film is subjected to interlaced scanning, using as a source of light the spot on the fluorescent screen of a cathode ray oscillograph tube, it is necessary to make some provision for the fact that the initial point of incidence of the scanning spot on the film has moved through a certain distance by the time the spot has been returned to approximately the top of the picture frame. The provision so made is known as "chasing" the film.

It is the object of the present invention to minimise inaccuracies in interlacing due to lack of register between successive sets of scanning lines.

According to the present invention, in a method of television transmission employing interlacing, an area of a film is scanned by an image of a scanning field of a cathode ray tube in one position and subsequently by another image of the same field in another position displaced longitudinally with respect to the film. In a particular method according to the invention, one of said images is projected upon said area while the other image is obscured, the latter image being projected upon said area, while the former is obscured after movement of said area through a distance equal to the longitudinal displacement of the scanning positions. The cathode ray is caused to trace a scanning field, two images of which are formed by an optical system including mirror surfaces which reflect both images into the plane of the cinematograph film to be transmitted. An obturator serves alternately to obstruct one of said images while permitting the other to fall upon an area of the film to be scanned, and then to obstruct that image while the second image falls upon the same area of the film after it has traversed a predetermined distance.

In order that the invention may be more clearly understood and readily carried into effect, an example of apparatus for carrying out the invention will now be described by way of example with reference to the accompanying drawing in which:

Fig. 1 represents a piece of film showing the relative positions of the picture frames and scanning field, and Fig. 2 shows diagrammatically the relative positions of the component parts of apparatus for carrying out the invention.

Referring to Fig. 1 of the drawing, a method of obtaining interlacing is shown in which it is assumed that the film I moves continuously downwardly, and a scanning beam, the trace 2 of which is shown, progresses upwardly during each scan. The first scan of the interlace occurs during the period in which the film I (frame A) moves through a distance equal to half the height of one picture frame represented by the distance Y—O. During this time the scanning beam traverses area O—Y, so that, by reason of the scanning direction and the movement of the film in the opposite direction, the entire film frame A is scanned. The scanning beam is then blacked out while it is returned to a point on the line Z down the film equal to the height Y—Z of a whole picture frame from the point on the line Y reached at the end of the first scan. The second scan of the film frame A then takes place, this frame having by the commencement of the second scan moved from its initial position through a distance equal to half the height of a picture, into the position between Z—Y. The scanning beam then begins at point Z and scans the area Z—O. During this interval, the film has moved in the direction indicated by the arrow an amount equal to one-half film frame, so that frame A is scanned completely for the second time. Further movement of the beam over the area marked O—Y causes a first scanning of the next successive film frame. It will be seen, therefore, that during the time that the area Z—Y is scanned by the cathode ray beam, two complete film frames are traversed.

The two scannings are effected during different parts of the frame traverse of the scanning beam, and it will be appreciated that unless the two halves of the wave form providing the frame deflection of the cathode ray are identical, inaccuracies in interlacing will occur. Thus, should the slope of the saw-tooth frame deflecting voltage not be straight throughout, but slightly curved at the top, the point of commencement of the line scans will be different near the completion of each half of the picture area. Again, any inequalities in the line scan at corresponding points in the two halves of the frame scan will produce inferior results in the transmitted picture.

The apparatus employed in the arrangement shown in Fig. 2 ensures that the picture area which is scanned twice will be subjected to a uniform scanning field. Referring to Fig. 2 of the drawing a cathode ray oscillograph tube 3 is provided with the usual electron gun structure 14 and deflecting plates 16 and 18. The deflecting plates (or alternatively deflecting coils) are energized by a deflection voltage generator 20 which constitutes a means for providing a scanning field of 405 lines, comprising two sets of 202½ lines interlacing with each other. The optical system includes an objective 4 and two mirrors 5 and 6 which are arranged at such an angle with respect to each other that they reflect two images of the scanning field 7 on the fluorescent screen of the cathode ray tube 3 into the path of movement of a continuously moving cinematograph film 8 to be transmitted, one image 9 being displaced from the other image 10 longitudinally of the film. In the case under consideration, the film is driven by a motor 22 and a sprocket 24 at the rate of 25 picture frames per second. The idler 26 directs the film from a reel (not shown) to the scanner. An obturator 11 is arranged between the mirrors and a gate, not shown in the drawing, but through which the film passes and serves to permit the image 9 of the scanning field 7 to fall upon the moving film 8 while the image 10 is obscured. Movement of the obturator 11 causes the image 9 to be obscured and permits the image 10 to fall upon the moving film, the direction of movement of which is indicated by the arrow 12.

Each image of the scanning field is arranged to occupy half the area of a picture frame. Thus, the distance $d$ in the drawing represents the height of a picture frame, the image will be equal to $\frac{1}{2} d$ in height.

The relation between the speed of movement of the film, the movement of the obturator and the frame scanning frequency of the cathode ray tube is such that during the period of $\frac{1}{50}$ of a second in which the film is exposed to the image 9 of the scanning field, the film moves through a distance equal to half a picture frame and, due to the opposite movement of the scanning beam, a whole picture frame is scanned. The obturator 11 is then actuated to obscure the first image 9, and the image 10 will then scan the same picture area or frame in another set of scanning lines interlacing with the first set of scanning lines. Since the motor 22 is driven from the deflection voltage generator 20, the film must move in synchronism with the scanning rate.

In order to compensate for the movement of the film, the amplitude of the frame scanning saw-tooth wave form is adjusted to ensure that in conjunction with the film movement the image of the scanning spot will traverse a whole film frame in $\frac{1}{50}$ of a second. Thus, as previously mentioned the image of the scanning field at 9 or 10 is equal in height to half the height of a picture frame.

It will be understood that modifications may be made within the scope of the invention. Thus, for example, suitable arrangements of lenses or prisms may replace the mirror system to produce two images of the fluorescent screen and any convenient shutter device may be used.

Again, the images may fall continuously upon the film and two photo-electric cells may be arranged behind the scanned area, one cell being switched into action while the other is inoperative.

I claim:

1. A television transmission system for scanning cinematograph film wherein the film moves continuously during scanning and wherein each film frame is scanned twice, comprising means for producing a beam of radiant energy adapted for scanning a fluorescent area in a line-for-line manner, means for producing a separate image of each half of the scanned area, the images being directed upon the film and slightly displaced longitudinally with respect thereto by an amount equal to an odd number of half lines, and means for moving the film at a uniform rate in a direction opposite to the scanning direction, the rate of film frame movement corresponding to the rate at which the area is scanned.

2. A television transmitting system for scanning cinematograph film wherein the film moves continuously during scanning and wherein each film frame is scanned twice and interlaced scanning is accurately accomplished, comprising means for electronically scanning a fluorescent area to produce a scanning light source area, means for producing two separate images of each half of the scanned area, the images being directed upon the film and each slightly displaced longitudinally with respect thereto by an amount equal to one half line and a number of whole lines, and means for moving the film at a uniform rate in a direction opposite to the scanning direction, the rate of film frame movement being equal to the area scanning rate.

3. A television transmitting system for scanning cinematograph film wherein the film moves continuously during scanning and wherein each film frame is scanned twice, comprising means for producing a beam of radiant energy adapted for scanning a luminous area in a line-for-line manner to produce a scanning beam of light, means for producing a separate image of each half of the scanned area, the combined heights of the images being equal to one film frame, means for directing the images upon the film and slightly displaced longitudinally with respect thereto by an amount equal to an odd number of half lines, and means for moving the film at a uniform rate in a direction opposite to the scanning direction, the film frame speed being equal to the area scanning speed, whereby two adjacent film frames are scanned for each scanning of said area.

GEORGE EDWARD CONDLIFFE.